Aug. 1, 1967  B. S. MARKS ET AL  3,334,057
ADHESIVE COMPOSITIONS COMPRISING CARBOXYL POLYMERS
AND POLYEPOXIDES
Filed April 17, 1961

INVENTORS
BURTON S. MARKS &
ROGER S. SEDGWICK

BY Mason, Porter, Diller & Stewart,

ATTORNEYS

United States Patent Office 3,334,057
Patented Aug. 1, 1967

3,334,057
ADHESIVE COMPOSITIONS COMPRISING CAR-
BOXYL POLYMERS AND POLYEPOXIDES
Burton S. Marks, Dolton, and Roger S. Sedgwick, Orland
Park, Ill., assignors to Continental Can Company, Inc.,
New York, N.Y., a corporation of New York
Filed Apr. 17, 1961, Ser. No. 103,470
15 Claims. (Cl. 260—23)

This invention relates to the preparation of a composition of matter of high internal strength and excellent adhesion; and more particularly to a composition based upon a molecular structure having a vinyl chain with branch groups effective for adhesion, the composition being competent of application in the forms of a plastisol or an organosol.

It has been a practice to make metal cans by forming body blanks into cylindrical or other shape, and connecting the edges by solder. When the two edges were overlapped, such a side seam is called a lap seam. When the blank is formed with interengaging hooks, the side seam is called a lock seam.

Various adhesives or cements have been employed as a substitute for solder: and have been successful for bodies where no major heating or internal pressure is exerted during the can history, and where the adhesive is resistant to the ambient atmospheres of the container's prospective employment and to the can contents. Many plastisol and organosol formulations have been proposed; but difficulties have been noted, due to lack of adhesion to the metal substrate and to migration of plasticizer either into an enamel on the substrate or into the contents of the container. In particular, vinyl chloride polymer resins have low adhesion properties.

It has been found that by adding COOH groups onto a vinyl polymer chain or backbone, the adhesion effect can be increased: and that excellent results may be attained by employing a vinyl polymer backbone having OH groups thereon, and then reacting at such OH groups with a carboxylic acid anhydride. Specific advantages are present when the selected anhydride molecule has an additional carboxyl or COOH groups in its structure, and the reaction is conducted to cause the active anhydride group to open and attach to an OH group on the backbone by an esterification reaction at one of the carboxyl sites of the anhydride group while the other carboxyl site thereof is brought to COOH form, so that the branch addition to the backbone has an ester type connection thereto, and also exhibits a pair of COOH groups for adhesion effects directly, or by later further reaction at epoxy groups of additives having themselves recognized adhesive ability. In general, fatty oils of unsaturated acids have good adhesion: and such additives can be the epoxy compounds thereof, such as the commercially available epoxidized soybean oil, epoxidized linseed oil, epoxidized safflower oil, epoxidized perilla oil, and epoxidized sunflower oil. Other polyepoxidized molecules include the epoxy ethers such as the diglycidyl ethers of bisphenol A and the diglycidyl ethers of aliphatic glycols. Examples of these glycols include butanediol, glycerine, diglycol ethers, etc.

The preferred anhydride is that of trimellitic acid, with a structural formula:

(1)
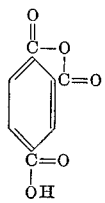

This mono-anhydride of 1,2,4-benzene tricarboxylic acid is commercially available, with a melting point of 168° C., a molecular weight of about 192, an equivalent weight of about 64, an acid number of about 876; and solubility of about 49.6 in acetone, but low solubility of about 1.06 in mineral spirits and about 0.4 in mixed xylenes.

The trimellitic anhydride is illustrative of the mono-anhydrides of aromatic acids with at least one additional ·COOH group besides those of the anhydride group. Other mono-anhydrides usable are the aromatic acids having three or more carboxyl groups of which two are present in the anhydride form; such as 1,2,3 benzene tricarboxylic anhydride and pyromellitic mono-anhydride. These compounds react at the acceptor groups by one of the carboxyls of the anhydride group while the other carboxyl is re-formed as ·COOH. Thus the branch has at least ·COOH groups thereon for later reaction with epoxy, e.g. by a poly-epoxy compound bonding by one epoxy ring at one such ·COOH group of one modified molecule and another epoxy ring at a ·COOH group of another modified molecule, to form cross-linked thermoset products.

The reaction of adding a branch upon a polyvinyl backbone having acceptor groups may be illustrated by the behavior at a part of a chain having an alcoholic OH group:

(2)
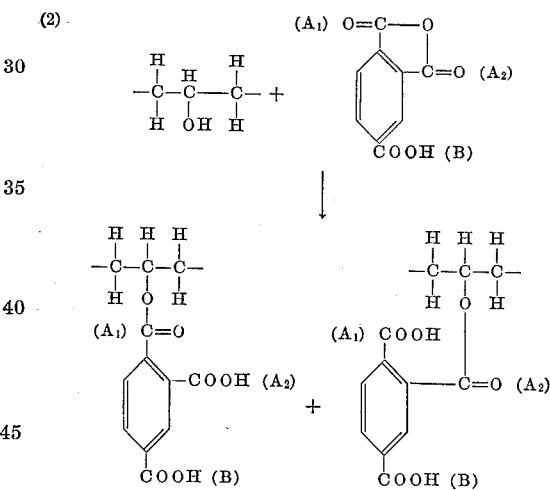

In the above equation, it is shown that the addition may occur at the ($A_1$) carboxyl group of the anhydride formation, that is, at the para position relative to the ·COOH or (B) group of the trimellitic anhydride, or at the ($A_2$) carobxyl group which is in meta position to the ·COOH or (B) group. In practice, both types of additions appear to occur.

In this, the illustrative trimellitic anhydride reacts at one carboxyl of the anhydride group to attach itself by ester formation to the backbone, while the second carboxyl of the anhydride group becomes completed so that the branch consists of a benzene ring connected to the backbone by an ester coupling, and with the ring exhibiting two COOH groups for adhesion or epoxy coupling. By the stated procedure, this is effected without significant reaction at the originally present ·COOH shown at (B) or that reconstituted at the anhydride group of the original component as shown at ($A_1$) or ($A_2$): that is, little or no cross-linkage between chain molecules occurs. During such reaction, there appears to be little blocking or steric factors involved at the ($A_1$) or ($A_2$) COOH which is in ortho position relative to the ester-forming group, although the group (B) appears more reactive thereafter to an epoxy of the plasticizer component.

This coupling of the anhydride may occur at acceptor groups other than OH: and a similar addition can be effected at $NH_2$, NH, SH groups coupled to a carbon atom in the chain.

When the modified polymer is employed with an epoxy compound having two or more epoxy groups on the molecule, e.g. epoxidized linseed or soybean oil, one epoxy group can react with a COOH group on another modified vinyl polymer molecule, and another with a COOH group on another modified vinyl polymer molecule, so that cross-linking occurs and the cured material exhibits thermoset properties and is highly resistant to later heating of the structure, regardless of whether the employment is as an adhesive between two metal substrates (as in a container seam) or as a thermoset enamel. Therewith, it is preferred to restrict the number of branch anhydride attachments per molecule, to avoid excessive cross-linking and brittleness when the adhesive is to be employed under conditions where such brittleness would be deleterious, and where flexibility is needed in the adhesive: and likewise to avoid cross-linking activity in the plastisol or organosol before it has been applied to the substrate and subjected to the scheduled curing.

One polyvinyl backbone structure, to which the addition can be effected, is a copolymer with 87 percent of vinyl chloride, 6 percent of vinyl acetate, and 7 percent of vinyl alcohol (based on hydrolyzed acetate groups): such can be derived by copolymerization of vinyl chloride and vinyl acetate, followed by partial hydrolysis of the acetate groups of the vinyl polymer. The material available commercially under the trademark VAGH has been found satisfactory as shown in Example I. Other suitable backbone structures are polyvinyl butyrals, acetals, and formals having hydroxyl groups at which the addition can be effected: such are included herein by the generic name of polyvinyl butyrals having unreacted OH groups. In the selected compounds the molecular weight of the backbone resin should be at least 10,000 and preferably 20,000 or over: and the acceptor groups attached to the backbone should be at least one half percent of the molecular weight: and can be greater than 3 percent. Thus a polyvinyl chloride:acetate:alcohol can have 6 or 7 percent of vinyl alcohol component, polyvinyl butyral can have 13 percent or more of unreacted vinyl alcohol sites, and polyvinyl alcohol can have all sites free for reaction.

The material can be employed as an adhesive for joining pieces of metal, or as an enamel. Such employment is illustrated in the accompanying drawing, in which.

Figure 1:
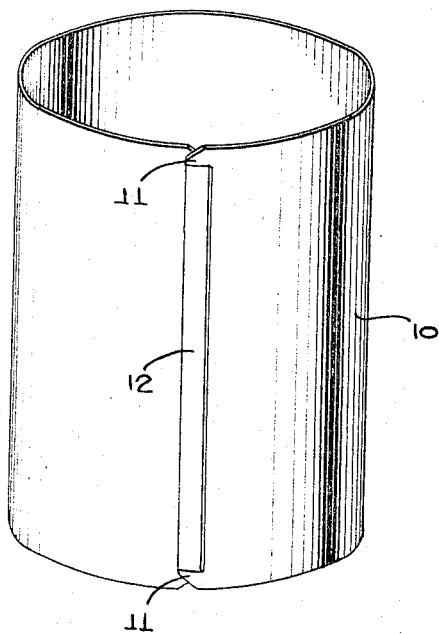
FIG. 1 is a perspective view of a can body having a side seam with lock and lap portions, and employing the instant material as an adhesive and seal.
Figure 2:
FIG. 2 is a sectional view, showing a lapped seam.
Figure 3:
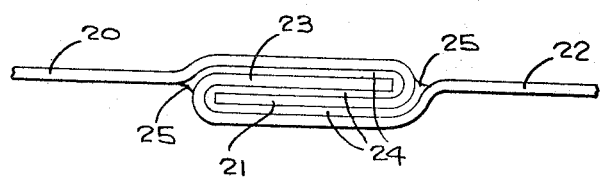
FIG. 3 is a sectional view showing a locked seam formed by hooks.

In the drawings, FIG. 1 the can body 10 is formed from a blank as usual, with a side seam composed of lapped portions 11 at the ends and a lock portion 12 at the center. Ends are applied in the usual way, by double seaming, after flanging the ends of the body. A lap seam in FIG. 2 is shown as having the two overlapping metal sheets or substrates 14, 15, with an adhesive bonding layer 16 of the instant material between them; and illustratively being a section through a lapped portion 11 in FIG. 1. The lock seam in FIG. 3 has the two metal sheets 20, 22 provided with respective hooks 21, 23: a layer 24 of the instant material fills interstices and bonds the sheets together: this material can form fillets 25 between the bight of each hook and the other sheet.

EXAMPLE I 250 grams of a vinyl copolymer (91% vinyl chloride, 3% vinyl acetate, 6% vinyl alcohol: the material available under the trademark VAGH being satisfactory), and 25 grams of anhydrous sodium acetate are dissolved in 1200 milliliters of dry methyl ethyl ketone: and heated for one hour at reflux. 18 grams of trimellitic anhydride were added, with stirring; and the reaction continued at reflux for 4 hours, with protection from atmospheric moisture by means of a calcium chloride drying tube. The reaction product was precipitated out by addition of 1500 milliliters of isopropyl alcohol, filtered, broken up, and washed with further isopropyl alcohol, then with dilute hydrochloric acid (normal solution), and then with water until the washings were neutral to pH paper. The polymer was dried. On analysis, it showed an acid number of 29.6 milligrams of KOH per gram of sample. This is equivalent to 5.1% of bound mono-ester of trimellitic acid, or a 71% reaction yield of the trimellitic anhydride with the vinyl copolymer resin.

This trimellitic-modified vinyl resin is formulated into an organosol. 100 grams of the resin is mixed with 40 grams of an epoxidized material such as epoxidized soybean oil, in 400 grams of methyl ethyl ketone, with stirring to assure solution: applied as an adhesive to metal, and heated for solvent removal and curing.

EXAMPLE II

The vinyl copolymer and trimellitic anhydride were caused to react in the proportion and with the materials as in Example I. The rate of reactivity during the course of branch-attachment was determined. The conditions were as in Example I, except that the initial refluxing of solvent, vinyl copolymer, and anhydrous sodium acetate was conducted for one and a half hours to ensure a more complete removal of reaction water. Aliquots were removed each hour, and the resin therein was precipitated and purified as in Example I. These samples were analyzed for acid number and intrinsic viscosity, from which the molecular weight, etc. was completed and tabulated as follows:

TABLE I

| Sample | Time | Acid No. | Percent TMA | I.V. | Mol. Wt. |
|---|---|---|---|---|---|
| 1 | 1 | 22.8 | 3.9 | 0.584 | 22,650 |
| 2 | 2 | 30.2 | 5.2 | 0.608 | 23,760 |
| 3 | 3 | 34.1 | 5.8 | 0.636 | 25,500 |
| 4 | 4 | 32.6 | 5.6 | 0.615 | 24,800 |
| Control A | | | | 0.565 | 21,800 |
| Control B | | | | 0.57 | 22,200 |

In Table I, "Time" represents the reaction time in hours. "Acid No." the number of milligrams of KOH for neutralizing one gram of the sample: "Percent TMA" the computed amount of trimellitic anhydride which was present as branch grouping after the time of reaction: "I.V." is the intrinsic viscosity (cyclohexanone at 20° C.) or "eta" of the usual viscosity formula: "Mol Wt." is the molecular weight. Control A shows the values for the stated vinyl copolymer itself, as determined by like test: while Control B shows the specification values for the particular vinyl copolymer.

The acid number values in Table I indicate a yield of branched resin of over 80 percent. The intrinsic viscosity values indicate that the trimellitic anhydride reacts by branch formation on the vinyl copolymer resin, whereas there has been insignificant reaction of COOH groups to effect chain extension or crosslinking.

EXAMPLE III

A series of like runs were made with different amounts of modified trimellitic anhydride: and employing with each branched resin product 40 grams of epoxidized (oxirane content, 6.4% oxygen) soybean oil per 100 grams of branched resin, with 400 grams of methyl ethyl ketone to give a solution or organosol of workable viscosity. This was used by a standard procedure to produce specimens of metal strips one inch wide, with the strips being lap-seam connected by a square inch of the adhesive such that only this area completely covers the other; the assembly was dried at 80° C. for two minutes to expel solvent; and then the cure continued at 385° F. for 25 seconds. Commercial tin plate designated as 75 pound base weight with a 0.25 pound tin coating was used. This tin plate designation is used in all subsequent examples.

Such specimens were tested for creep, by applying a static load of 20 pounds. The observed results were:

TABLE II

| Percent TMA Grafted | Temperature at Test (° F.) | Creep Observations |
|---|---|---|
| 0.5 | 250 | Failed in 10 minutes. |
| 0.9 | 275 | Failed after 30 minutes. |
| 2.7 | 275 | No creep after 2 hours. |
| 2.7 | 300 | Failed after 1 hour. |
| 2.9 | 300 | No creep after 2 hours. |
| 4.1 | 300 | Do. |
| 4.5 | 300 | Do. |

All specimens were free of creep at room temperature; and hence are useful as side seam cements in metal cans which will not be heated above, say, 200° F. When the can is to contain a product, such as a food, which must be heated to 275° F. for processing, the resin should have 2.5% or more of the trimellitic anhydride branching thereon. Coupled with the adhesion of the resins with COOH content of 2.5 to about 5.8% is their greater solubility in ketone and like solvents, such as methyl ethyl ketone: wherewith a greater solids content can be used, with less solvent to be expelled from an organosol incidental to curing.

EXAMPLE IV

In another series of tests with the same components as in Example I, but employing 4.2% of modified trimellitic anhydride, the conditions for expelling solvent, after the application between the metal strips were varied and tear-burst or peel measurements made. CMQ (can-making quality, 80 pound base weight, blackplate steel; this designation plate used in all subsequent examples) sheets were employed. After drying for solvent removal, the specimens were bonded by heating at 350° F. for 25 seconds in a Carver Press under 50 p.s.i. pressure.

A general procedure for testing the strength of an adhesive, which indicates the resistance of the joint under tear-burst conditions, is by applying the adhesive between two metal pieces for a defined area, curing the adhesive, and then determining the load required to pull the pieces apart. For example, a metal sheet may have a one inch stripe of the adhesive applied to one side at one end, with shims of 0.003 inch thickness defining the thickness of stripe: a like sheet is superimposed with the edges alined, and the assembly heated under pressure for curing. The adhering sheets are cut to one inch widths, each with the bonded area at one end of each specimen. A Dillon Universal Tester is provided with a 3½ inch diameter mandrel, the free edges of a specimen are spread and the specimen straddled over the mandrel, with the ends clamped against shifting. The jaw separation rate of the tester is set at one inch per minute, and the pressure scale reading of the tester observed as the strips are peeled apart, e.g. as a force in pounds.

The results were:

TABLE III (A) *Air-dried at room temperature*

Time (drying), hours:                Tear-burst value
1 ------------------------------------------- 75
2 ------------------------------------------- 102
4 ------------------------------------------- 87
6 ------------------------------------------- 108
8 ------------------------------------------- 101
16 ------------------------------------------ 108

(B) *Oven-dried at 80° C. and bonded at once*

Time (drying), minutes:            Tear-burst value
1 -------------------------------------------- 68
2 -------------------------------------------- 90
3 -------------------------------------------- 99
4 -------------------------------------------- 108
5 -------------------------------------------- 104
6 -------------------------------------------- 108
8 -------------------------------------------- 117
10 ------------------------------------------- 132
15 ------------------------------------------- 73
20 ------------------------------------------- 70

(C) *Oven-dried at 80° C.: Bonded 24 hours after drying*

Oven drying time, minutes:        Tear-burst value
1 -------------------------------------------- 110
2 -------------------------------------------- 109
3 -------------------------------------------- 110
4 -------------------------------------------- 110
5 -------------------------------------------- 110
6 -------------------------------------------- 120
8 -------------------------------------------- 106
10 ------------------------------------------- 117
15 ------------------------------------------- 75
20 ------------------------------------------- 73

(D) *Oven-dried at 80° C.: Bonded 72 hours after drying*

Oven drying time, minutes:        Tear-burst value
1 -------------------------------------------- 97
2 -------------------------------------------- 109
3 -------------------------------------------- 82
4 -------------------------------------------- 82
5 -------------------------------------------- 90
6 -------------------------------------------- 84
8 -------------------------------------------- 111
10 ------------------------------------------- 95
15 ------------------------------------------- 73
20 ------------------------------------------- 35

The tear-burst values are in pounds per linear inch. The results show that evaporation at room temperature requires at least two hours: but the expulsion of most of the solvent can be conducted at 80° C. in 2 or 3 minutes. The effect of over-drying is revealed by a premature change in the adhesive, so that a poor bond is present after the stated high-temperature curing; such poor bond being generally brittle and non-continuous. Premature change can also occur if an oven drying is followed by a long delay before the high temperature curing.

EXAMPLE V

The effects of the trimellitic anhydride as modified groups upon the vinyl resin backbone, and of mere mixtures of the unmodified vinyl resin and trimellitic anhydride, were compared. The anhydride content of the mixtures was adjusted to correspond to the anhydride content of the modified resins. These were used as adhesives by the standard procedure, so one inch lengths of strips one inch wide were bonded: after oven-drying at 80° C. over two minutes, the specimens were cured at 350° F. for 25 seconds.

TABLE IV

| | Adhesive | CMQ Steel | 0.25 lb. Tinplate |
|---|---|---|---|
| A | Mixture, .0% TMA | In all cases a film was formed which did not adhere sufficiently to the metal to permit testing | |
| | Mixture, 1% TMA | | |
| | Mixture, 3% TMA | | |
| | Mixture, 5% TMA | | |
| B | Modified, 0.63% TMA | 125 | 78 |
| | Modified, 1.61% TMA | 103 | 78 |
| | Modified, 2.6% TMA | 108 | 79 |
| | Modified, 4.8% TMA | 121 | 87 |
| | Modified, 5.1% TMA | 105 | 75 |

It was observed that with the modified resin, having the stated content of trimellitic anhydride (TMA), amounts between 0.63 and 5.1% gave little difference in peel strength: but a tendency toward brittleness was observed at the higher COOH contents. The results in Table IV show that mechanical mixtures do not lead to the desired result.

In can-making and other practices where blanks are to receive the adhesive, and then be stacked for feeding to an assembly device, trouble occurs if the sheets stick together or "block" in the stack. With the present materials, it was found that drying at 80° C. for six to ten minutes after application provided sheets which were free from the trouble, in tests with resin having 4.8% of trimellitic anhydride additions. The tests made were more sever than occurring in normal practice. Each metal blank received a ½ inch margin of the adhesive along an edge, at both sides: was dried for 2 to 10 minutes at 80° C.; 4 to 6 of the blanks were stacked on one another; and the stack was pressed out 2000 p.s.i. for 10 minutes. After 2 minutes drying, the adhesive was not tacky to the touch, but blocking occurred with some stripping from one blank at separation. After 4 minutes drying, there was little blocking except when the film thickness was so great that solvent diffusion was relatively slow, e.g. at over 2 mils. No blocking was noted at 6 minutes or more, for films of 2 mils. Tear-burst values were determined, as above, for specimens coated and dried for 6 minutes at 80° C.: metal sheets of CMQ, CMQ coated with a phenolic based enamel, 0.25 pound tin plate, aluminum and of HINAC plate so treated had strength values within the acceptable range.

EXAMPLE VI

Lap seam containers were prepared from aluminum blanks for "202" size citrus cans. These were alternately striped on opposite edges by a ¼ inch width of grafted vinyl resin (with 2.5 to 3.4% of trimellitic anhydride), predried at 80° C. for 2–3 minutes, and then fed through a lap seam body maker provided with a flame for heating the seam for about 0.01 second at the speed of blank travel. A visually satisfactory lap seam was produced. The can bodies were then flanged as usual, employing a geared arbor-type press, which resulted in tearing of some bodies with the lap seam remaining intact.

EXAMPLE VII

Hook or lock seam containers were prepared by machine and by hand. Body blanks for lock-and-lap seam containers, where 0.281 inch at each end is lapped and the central part of length is hooked together, were striped with alternate ¼ inch adhesive margins of the adhesive of Example VI, and passed through a standard body maker, after drying at 180° F. for two minutes. For handmade cans, the same adhesive was applied to the preformed hooks on the blanks, followed by drying and hand tool-closing of the hooks to form side seams. In each case, the formed bodies were then cured in an oven at 350° F. for two minutes. The bodies were flanged and an end applied. Some of the bodies were filled with water to a reference test level. Second ends were applied. Tests were made for initial bursting pressure: that is, before any further heating: and as to bursting pressure after processing the water-filled cans under steam at 250° F. for one hour. The results were:

TABLE V

| Body | Bursting Pressure | |
|---|---|---|
| | Initial, p.s.i. | After Process, p.s.i. |
| A | 97 | 93 |
| B | 107 | 95 |
| C | 108 | 110 |

All can bodies in Table V were of 211 by 413 standard size. Bodies A were of CMQ plate. Bodies B were of 0.25 pound tin plate, with adhesive in the side seams only. Bodies C were of CMQ plate, with a standard phenolic resin coating. The bursting pressure is set out in pounds per square inch for before ("Initial") and after processing with a water content to standard filling height; the processing being under steam at 250° F. for one hour. Saturated steam pressure at 250° F. is about 16 p.s.i.; showing that the cans have a large safety factor over the expected internal pressure for processing. No significant difference was found between machine and hand-made cans: except that some failures of machine-made cans occurred at lap areas: when the cans were side-striped at the side seam area using the adhesive of Example VI on both inner and outer sides, such failures were absent. These failures of machine-made cans, after processing, were at the lap areas present in such cans at the lapped juncture of the side seam and the double-seaming for the can ends. Both hand-made and machine-made cans showed continuity, with and without the application of the side strip at the side seam area, and no failures at the lock areas of the side seams. Salt ooze tests were conducted on other specimens by using 3% brine solution instead of water as a filling, with processing of the closed cans under steam at 250° F. for an hour, with slow cooling. Leakage is then revealed by salt residue: no leakage was found at locked areas or lap areas of the side seams; but some instances of leakage were noted at the double seams or at the juncture of the double seam and the side seam, that is, where parts of the side seam were flanged for forming the double seam.

EXAMPLE VIII

In a series of tests, to evaluate the relation of tear-burst values which are important with lapped seams, and the values with hook or locked seam structures, resins were prepared with varying amounts of trimellitic anhydride addition, and mixed with epoxidized (oxirane content, 6.4% oxygen) soybean oil in the foregoing ratio of 40 parts by weight of oil to 100 parts of the modified resin, under the condition as in Example III.

The results were:

TABLE VI
[Tear-burst, pounds per linear inch]

| Plate | V-2 | V-4 | V-62 | V-8 | V-9 | V-10 | V-12 |
|---|---|---|---|---|---|---|---|
| CMQ | 112 | 140 | 93 | 86 | 115 | 92 | 93 |
| No. 25 Sn | 82 | 68 | 58 | 65 | 68 | 66 | 33 |
| Al | 68 | 80 | 44 | 46 | 85 | 63 | 43 |
| Hinac | 100 | 92 | 72 | 68 | 78 | 68 | 83 |

[Hooks]

| Plate | V-2 | V-4 | V-62 | V-8 | V-9 | V-10 | V-12 |
|---|---|---|---|---|---|---|---|
| CMQ | 94/140 | 98/98 | 133/89 | 101/35 | 92/51 | 134/99 | 141/91 |
| No. 25 Sn | 119/92 | 115/65 | 130/72 | 190/50 | 90/64 | 106/61 | 71/76 |
| Al | 73/94 | 68/114 | 75/75 | 75/116 | 69/84 | 65/61 | 52/30 |
| Hinac | 85/81 | 60/72 | 96/150 | 130/120 | 76/74 | 83/77 | 107/179 |

In Table VI, "plate" designates the substrate material to be adhered together; "CMQ" the black plate steel, "No. 25 Sn" the commercial 0.25 pound tin plate; "Al," aluminum; "Hinac" the commercial sheets sold under the trademark for can-making. "V-2" contained polyvinyl chloride:acetate:alcohol resin as in Example I, with 0.5% trimellitic anhydride added thereto; "V-4" had 0.91% anhydride; "V-62" had 2.6% anhydride; "V-8" had 2.8% anhydride; "V-9" had 3.2% anhydride; "V-10" had 4.2% anhydride; "V-12" had 4.8% anhydride: the same backbone resin being used in each case. The "Hook" tests were twofold, with the two values reported in the form A/B above, where A represents the pounds of pull at the ends of a specimen one inch wide and joined by a hook or lock seam including the stated modified resin mixture, with curing, such pull being increased by operating the standard test machine at a constant rate of one inch per minute, and observing the value at initial opening or breaking at the hooks, and B represents the tensile shear value of remaining lap area after the hook of the specimen had been opened and uncoiled. The one inch wide hook samples were cut from metal cans similar to those prepared in Example VII.

EXAMPLE IX

Vinyl polymer resins, made by condensing to form a polyvinyl butyral but with unreacted OH in the product, were employed which contained 9 to 13 percent by weight of unreacted vinyl alcohol sites. For example, vinyl acetate is polymerized and then partially hydrolyzed by an acid or base, so that many of the —CO.CH$_3$ or acetate branch groups are removed to form a polyvinyl acetate: alcohol compound: this is then reacted with butyraldehyde to yield cyclic groups on the backbone, e.g.

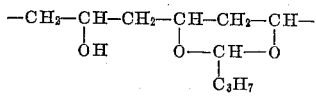

where one such butyral cyclic group and one OH group are shown: the OH group thus being an unreacted polyvinyl alcohol site. A vinyl polyvinyl butyral resin of this type is commercially available under the trademark B-76.

100 grams of such polyvinyl butyral resin, with 9 to 13% of unreacted vinyl alcohol sites, and 7.5 grams of anhydrous sodium acetate were dissolved in 1500 milliliters of dry methyl ethyl ketone, and heated with refluxing for a half hour, atmospheric moisture being excluded. 7 grams of trimellitic anhydride was added, and refluxing with stirring was continued for 4 hours. Water was added, and a somewhat gummy initial product was precipitated. This initial product was separated, redissolved in isopropanol, and again precipitated by water. This final product was non-gummy and, after drying, was analyzed and its acid number found to be 21.6 milligrams of KOH per gram of sample, corresponding to 3.7% of bound anhydride and equivalent to a 53% yield by reaction of trimellitic anhydride and the polyvinyl butyral backbone.

This modified polyvinyl butyral resin can be employed as a solid, heating for softening, for its adhesive effect between metal surfaces. Also, it can be dissolved, e.g. in isopropanol, applied as a liquid, the solvent expelled, and heat-bonding effected. It behaves as a thermoplastic adhesive. Further, it can be prepared in mixture with 40 parts by weight of epoxidized soybean oil per 100 parts by weight of the modified polyvinyl butyral resin, by milling together or in a solvent; and so applied with subsequent heating for curing whereby the epoxy groups combined at the COOH groups of the added branches and increased the apparent length of such branches. Without solvent, the mixture is an oily solid: the presence of solvent facilitates application to the metal: after expulsion of the solvent, heating to 350° F. for 15-25 seconds effects a curing and bonding to a non-oily strongly adherent interlayer.

Upon testing for tear-burst or peel strength as above, with one inch square lap areas between two pieces of 0.25 pound tin plate, using the above branched or modified polyvinyl butyral resin, formed in methyl ethyl ketone solution to a working viscosity, with drying at 80° C. for two minutes, and then heated at 430° F. for 20 seconds in a Carver press under 60 pounds pressure, the following values were noted:

TABLE VII

| | Adhesive | Strength in Pounds per Linear Inch |
|---|---|---|
| 1 | PVB | 30 |
| 2 | PVB:ESB | 33 |
| 3 | PVB:ESB:TMA | 32 |
| 4 | PVB:TMA | ¹ 36 |
| 5 | Graft resin:ESB | 49 |

¹ Brittle.

In Table VII, "PVB" denotes a polyvinyl butyral resin with 9 to 13% unreacted vinyl alcohol sites; "ESB" denotes epoxidized (oxirane content, 6.4% oxygen) soybean oil, such as that sold commercially under the trademark G-62; "TMA" denotes trimellitic anhydride. In Specimens 1, the adhesion strength of the backbone resin is set out: in Specimens 2, a mixture of 100 parts of the backbone resin and 40 parts of the epoxy fatty oil was present: in Specimens 3, 100 parts of the resin, 40 parts of the epoxy fatty oil, and 3.7 parts of the anhydride were mixed: in Specimens 4, the mixture was 100 parts of the resin and 3.7 parts of the anhydride. Specimens 5 show that the modified resin, with 3.7% of anhydride reacted thereon, and the epoxy fatty oil in the ratio of 100 to 40 respective parts, has a significantly greater strength as compared to like application and heating for mixtures of the components. The parts stated are by weight.

In the foregoing, the term "plastisol" is employed to designate a mixture which is fluid or semi-fluid at room or elevated temperature and which during curing undergoes a conversion to a homogeneous form. By "organosol" is designated such a mixture based upon organic components in a diluent solvent, which after expulsion of the solvent is effective as a solid adhesive as well as a coating, with or without chemical reaction.

The epoxy compound employed as a reactive plasticizer and for reaction during the curing can be an epoxidized unsaturated vegetable oil, including the poly-epoxidized products of soybean, linseed, and safflower oils. The amount used can be varied from 20 to 50 parts by weight to 100 parts of the modified resin, dependent upon the number of epoxy groups per molecule and the number of —COOH groups present in the added branches on a resin molecule and the physical characteristics of the desired cured resin.

In general, the modified backbone resin should have from ½ to 6% of a mono-anhydride bonded thereto. Where processing such as heating to 250° F. (using pressurized steam) is intended, at least 2.5% of the anhydride should be present. When the amount of added anhydride exceeds about 5.5 percent, the tear-burst strength values tend to decrease, apparently due to excessive cross-linking and to resulting brittleness.

It will be understood that the illustrative practices are not restrictive, and that the invention can be employed in many ways within the scope of the appended claims.

What is claimed is:

1. A modified polymer having an average molecular weight in excess of 10,000 characterized as a linear-vinyl polymer having on its side-chain acceptors 0.5 to 6.0% by weight of the polymer of an aromatic polycarboxylic acid having at least two unreacted free carboxyl groups; said linear-vinyl polymer containing at least 1% by weight of its average molecular weight of a side-chain acceptor attached directly to the carbon atoms in the chain for reaction with the carboxyl group of an aromatic polycarboxylic acid anhydride; said acceptor selected from the group consisting of hydroxyl groups, mercaptans, primary and secondary amine groups.

2. A thermoset-forming polymeric composition comprising a modified polymer having an average molecular weight in excess of 10,000 and approximately 20–50 parts-by-weight for each 100 parts-by-weight of said modified polymer of an epoxy-containing cross-linking agent selected from the group consisting of a diglycidyl ether of an aliphatic glycol, a diglycidyl ether of p,p'-isopropylidene bisphenol and an epoxidized unsaturated vegetable oil; said modified polymer characterized as a linear-vinyl polymer having as its side-chains 0.5 to 6.0% by weight of an aromatic polycarboxylic acid wherein at least two carboxyl groups of the acid remain free for reaction with said cross-linking agent; and at least 1% by weight of said linear-vinyl polymer's average molecular weight consists of side-chain acceptors attached directly to the carbon atoms in the chain and selected from the group consisting of hydroxyl groups, mercaptans, primary and secondary amine groups for reaction with the aromatic acid anhydride which is the precursor of said side-chains.

3. The modified polymer of claim 1 further characterized in that the linear-vinyl polymer is a copolymer of vinyl chloride, vinyl acetate and vinyl alcohol.

4. The modified polymer of claim 1 further characterized in that the linear-vinyl polymer is a polyvinyl butyral.

5. The modified polymer of claim 1 further characterized in that the linear-vinyl polymer is a copolymer of vinyl chloride, vinyl acetate and vinyl alcohol and the aromatic polycarboxylic acid is trimellitic acid.

6. A method of preparing modified polymers which comprises adding onto a linear-vinyl polymer having an average molecular weight of at least 10,000, approximately 0.5 to 6.0% by weight of the polymer of a monoanhydride of an aromatic polycarboxylic acid having at least three carboxyl groups per molecule; at least 1% by weight of said vinyl polymer's average molecular weight being side-chain acceptors attached directly to the carbon atoms in the chain capable of reaction with a carboxyl group of said aromatic acids; said acceptors selected from the group consisting of hydroxyl groups, mercaptans, primary and secondary amine groups.

7. The method of claim 6 further characterized in that the linear-vinyl polymer is a copolymer of vinyl chloride, vinyl acetate and vinyl alcohol.

8. The method of claim 7 further characterized in that the monoanhydride of the aromatic polycarboxylic acid is a monoanhydride of trimellitic acid.

9. The method of claim 6 further characterized in that the linear-vinyl polymer is polyvinyl butyral and the aromatic polycarboxylic acid is a monoanhydride of trimellitic acid.

10. The composition of claim 2 further characterized in that the modified polymer is a reaction product of a copolymer and a monoanhydride of trimellitic acid, said copolymer being prepared from vinyl chloride, vinyl alcohol and vinyl acetate.

11. The composition of claim 2 further characterized in that the cross-linking agent is an epoxidized unsaturated vegetable oil.

12. The composition of claim 11 further characterized in that the unsaturated vegetable oil is epoxidized soy bean oil.

13. The composition of claim 2 further characterized in that the cross-linking agent is a diglycidyl ether of p,p'-isopropylidene bisphenol.

14. The composition of claim 2 further characterized in that the modified polymer is a reaction product of polyvinyl butyral and a monoanhydride of trimellitic acid.

15. A method of bonding metal surfaces which comprises applying between said surfaces an intervening layer consisting essentially of the thermosetting polymeric composition of claim 2.

References Cited

UNITED STATES PATENTS

| | | | |
|---|---|---|---|
| 2,375,388 | 5/1945 | Ryan | 260—23 |
| 2,379,309 | 6/1945 | Malm et al. | 260—91.3 |
| 2,604,464 | 7/1952 | Segall et al. | 260—78.4 |
| 2,768,153 | 10/1956 | Shokal | 260—78.4 |
| 2,796,413 | 6/1957 | Baer | 260—91.3 |
| 2,908,663 | 10/1959 | Masters | 260—23 |
| 2,919,255 | 12/1959 | Hart | 260—23 |
| 2,947,712 | 8/1960 | Belanger et al. | 260—47 |
| 2,949,438 | 8/1960 | Hicks | 260—23 |
| 3,118,853 | 1/1964 | Hart et al. | 260—23 |

DONALD E. CZAJA, *Primary Examiner.*

M. STERMAN, LEON J. BERCOVITZ, *Examiners.*

T. D. KERWIN, R. A. WHITE, *Assistant Examiners.*